US011351759B2

(12) United States Patent
Couturier et al.

(10) Patent No.: US 11,351,759 B2
(45) Date of Patent: Jun. 7, 2022

(54) INSULATING PANEL FOR AN INSULATED AIR-FLOW CASING AND INSULATED AIR-FLOW CASING COMPRISING SUCH AN INSULATING PANEL

(71) Applicant: Carrier Corporation, Palm Beach Gardens, FL (US)

(72) Inventors: Fabien Couturier, Vanzy (FR); Bertrand Jacquin, Saint Maximin (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/124,796

(22) Filed: Dec. 17, 2020

(65) Prior Publication Data
US 2021/0221105 A1 Jul. 22, 2021

(30) Foreign Application Priority Data

Jan. 16, 2020 (EP) .................................... 20305033

(51) Int. Cl.
*B32B 19/04* (2006.01)
*B32B 3/26* (2006.01)
(Continued)

(52) U.S. Cl.
CPC ............ *B32B 19/041* (2013.01); *B32B 3/266* (2013.01); *B32B 5/02* (2013.01); *B32B 15/18* (2013.01);
(Continued)

(58) Field of Classification Search
CPC ......... B32B 19/041; B32B 3/266; B32B 5/02; B32B 15/18; B32B 2262/101; B32B 2307/304; Y10T 428/24777; Y10T 428/24314; Y10T 428/24331; Y10T 428/24198

See application file for complete search history.

(56) References Cited

U.S. PATENT DOCUMENTS 6,205,738 B1 3/2001 Chen
6,530,191 B2 3/2003 Rieke et al.
(Continued)

FOREIGN PATENT DOCUMENTS

CN 203258828 U 10/2013
EP 0757136 A1 2/1997
(Continued)

OTHER PUBLICATIONS

European Search Report for European Application No. 20305033.1, International Filing Date Jan. 16, 2020, dated Jul. 16, 2020, 7 pages.

*Primary Examiner* — David Sample
*Assistant Examiner* — Donald M Flores, Jr.
(74) *Attorney, Agent, or Firm* — Cantor Colburn LLP

(57) ABSTRACT

This insulating panel for an insulated air-flow casing comprises an inner sheet forming an inner wall, an outer sheet fastened to the inner sheet and forming an outer wall, a layer of insulating material placed between the inner and outer sheets, and a peripheral edge extending transversally between the inner wall and the outer wall. The peripheral edge comprises at least a first and a second rows of perforations, and the perforations of the second row are placed with respect to the first row of perforations in a staggered manner.

12 Claims, 5 Drawing Sheets

(51) Int. Cl.
   *B32B 5/02*    (2006.01)
   *B32B 15/18*   (2006.01)
   *B32B 17/02*   (2006.01)

(52) U.S. Cl.
   CPC ........ *B32B 17/02* (2013.01); *B32B 2262/101* (2013.01); *B32B 2262/108* (2013.01); *B32B 2307/304* (2013.01); *Y10T 428/24198* (2015.01); *Y10T 428/24314* (2015.01); *Y10T 428/24331* (2015.01); *Y10T 428/24777* (2015.01)

(56) References Cited

U.S. PATENT DOCUMENTS

| | | |
|---|---|---|
| 6,676,234 B2 | 1/2004 | Herbeck et al. |
| 6,722,151 B2 | 4/2004 | Sinazzola et al. |
| 6,792,722 B2 | 9/2004 | Beser et al. |
| 7,526,903 B2 | 5/2009 | Kandasamy |
| 2004/0068939 A1 | 4/2004 | Beser et al. |
| 2006/0283657 A1 | 12/2006 | Dubensky et al. |
| 2010/0029195 A1 | 2/2010 | Jalali et al. |
| 2011/0105011 A1 | 5/2011 | Dubensky et al. |
| 2011/0291533 A1 | 12/2011 | McFarland |

FOREIGN PATENT DOCUMENTS

| | | | |
|---|---|---|---|
| EP | 1113116 A2 | 7/2001 | |
| EP | 1053435 B1 | 5/2003 | |
| EP | 1312725 A1 * | 5/2003 | ............ E04C 2/292 |
| EP | 1312725 A1 | 5/2003 | |
| EP | 1524379 A1 | 4/2005 | |
| EP | 1409930 B1 | 10/2006 | |
| JP | H11344236 A | 12/1999 | |
| JP | 5874784 B2 | 3/2016 | |

* cited by examiner

INSULATING PANEL FOR AN INSULATED AIR-FLOW CASING AND INSULATED AIR-FLOW CASING COMPRISING SUCH AN INSULATING PANEL

CROSS-REFERENCE TO RELATED APPLICATIONS

This application claims priority to European Patent Application No. 20305033.1, filed Jan. 16, 2020, the disclosure of which is incorporated herein by reference in its entirety.

BACKGROUND

The present invention concerns an insulating panel for an insulated air-flow casing, and insulated air-flow casing comprising such an insulating panel.

Insulated air-flow casing such as air handling units, for instance for air conditioning, form tunnels in which an air flow circulates. Some air handling units are built with insulating panels made of an assembly of two metal sheets embodying an insulating material such as glass wool. Mechanical assembly between the insulating panels and the mechanical structure of the air handling units, or between the inner wall and the outer wall of the insulating panels, creates thermal bridges between the inner side of the air handling unit and the outside leading to thermal losses. When a hot air is circulated in an air handling unit, thermal bridges can lead to the outer wall heating up and subsequent thermal loss. The external wall temperature may be an indicator for product certification. Current insulation solutions, such as synthetic foam gaskets, or double metal sheets panels embodying insulating material, may not be efficient enough to satisfy the standards. Another insulation solution such as plastic frame between panels is efficient but not cost effective.

SUMMARY

The aim of the invention is to provide a new insulating panel for an insulated air-flow casing, which allows reducing the thermal bridges and thermal losses.

To this end, the invention concerns an insulating panel for an insulated air-flow casing, comprising an inner sheet forming an inner wall, an outer sheet fastened to the inner sheet and forming an outer wall, a layer of insulating material placed between the inner and outer sheets, and a peripheral edge extending transversally between the inner wall and the outer wall. This insulating panel is characterized in that the peripheral edge comprises at least a first and a second rows of perforations, and in that the perforations of the second row are placed with respect to the first row of perforations in a staggered manner.

Thanks to the invention, the edge of the panel is interrupted by perforations which mitigate thermal conduction towards the outer wall of the insulating panel. The thermal bridges are therefore reduced, allowing reduction of the outer wall temperature.

According to further aspects of the invention, which are advantageous but not compulsory, such an insulating panel may incorporate one or several of the following features.

Along a direction transversal to the edges, the perforations of the second row of perforations cover spaces separating the perforations of the first row of perforations, such that any thermal dissipation path going from the inner wall towards the outer wall crosses a perforation.

Along a path going from the inner wall towards the outer wall, the rows of perforations are located after fastening areas of the insulating panel with a structure of the insulated air-flow casing or with another insulating panel of the insulated air-flow casing.

The perforated edge is formed by a folded portion of the outer sheet.

The perforations have an elongated shape extending along longitudinal axes defined by the edges.

The invention also concerns an insulated air-flow casing comprising at least one insulating panel as mentioned here above.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
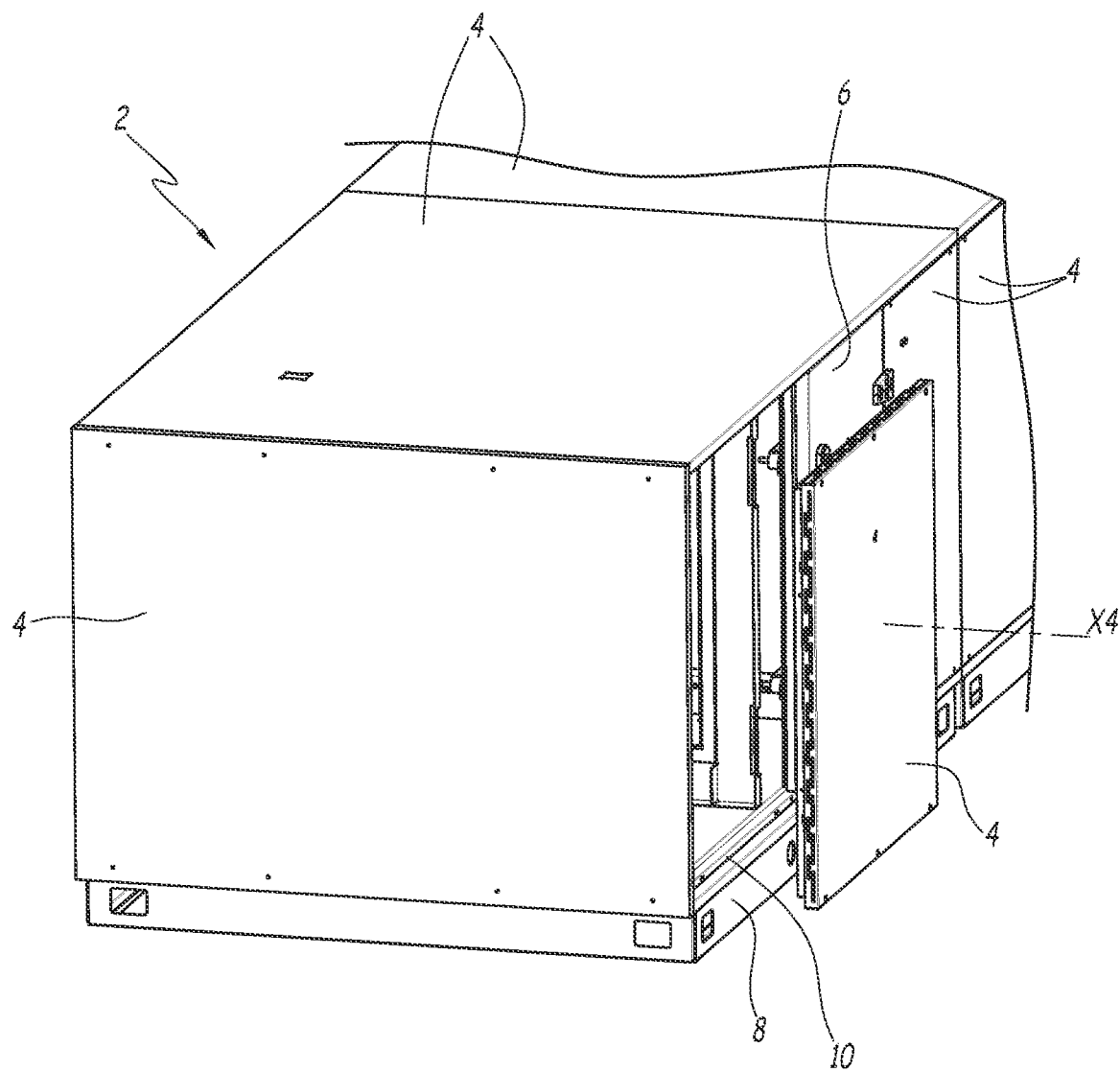
FIG. 1 is a perspective view of a portion of an insulated air-flow casing according to the invention, with an insulating panel according to the invention being dismounted.

As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 represents an air handling unit 2, which is built with insulating panels 4 fastened on a frame comprising structural beams 10. The air handling unit 2 comprises a base 8. While most insulating panels 4 are fixed with respect to the structural beams 10, at least one of the insulating panels may be a door 6 openable for servicing the inner side of the air handling unit 2.

The air handling unit 2 may be connected to non-shown air pipes and fluid ducts, and may comprise, in an inner volume delimited by the insulating panels 4, air handling devices such as heat exchangers, fans, filters, or the like, for air heating or cooling.

The invention can also be applied to rooftop units, heat recovery units and ventilation units or more generally, any type of insulated air-flow casings, in other words any insulated structure inside which an air flow is circulated.

The insulating panels 4 insulate an inner side I of the air handling unit 2 with respect to the exterior environment E. A non-shown air flow circulates in the inner side I of the air handling unit 2. For example, the insulating panels 4 prevent heat circulating in the air handling unit 2 from dissipating outside the air handling unit 2.

Each insulating panel 4 comprises an inner wall 40, oriented towards the inner side I of the air handling unit 2, and an outer wall 44 oriented towards the exterior environment E. The panel 4 comprises a transversal edge 42 extending between the inner wall 40 and the outer wall 44. X4 denotes a direction perpendicular to the inner and outer walls 40 and 44.

The insulating panel 4 is formed by an inner metal sheet 46, an outer metal sheet 48, which are fastened together, and a layer of insulating material 50, integrated within the inner and outer sheets 46 and 48. The inner metal sheet 46 bears the inner wall 40, while the outer sheet 48 bears the outer wall 44.

The peripheral edge 42 is formed by a main portion 42a, an inwardly folded portion 42b, and an end portion 42c. The main portion 42a is parallel to the direction X4 and formed by a folded portion of the outer sheet 48 which extends perpendicular to the outer wall 44. The inwardly folded portion 42b is parallel to the outer wall 44, and the end portion 42c extends from the inwardly folded portion 42b. The inner sheet 46 comprises a folded portion 46a which is parallel and fastened to the end portion 42c. The folded portion 46a and the end portion 42c are fastened together using for example riveting.

The portions 42b and 46a define a square slot which receives one of the structural beams 10 of the air handling unit 2. The portion 42b is fastened to the structural beam 10 forming a fastening area 56.

Figure 2:
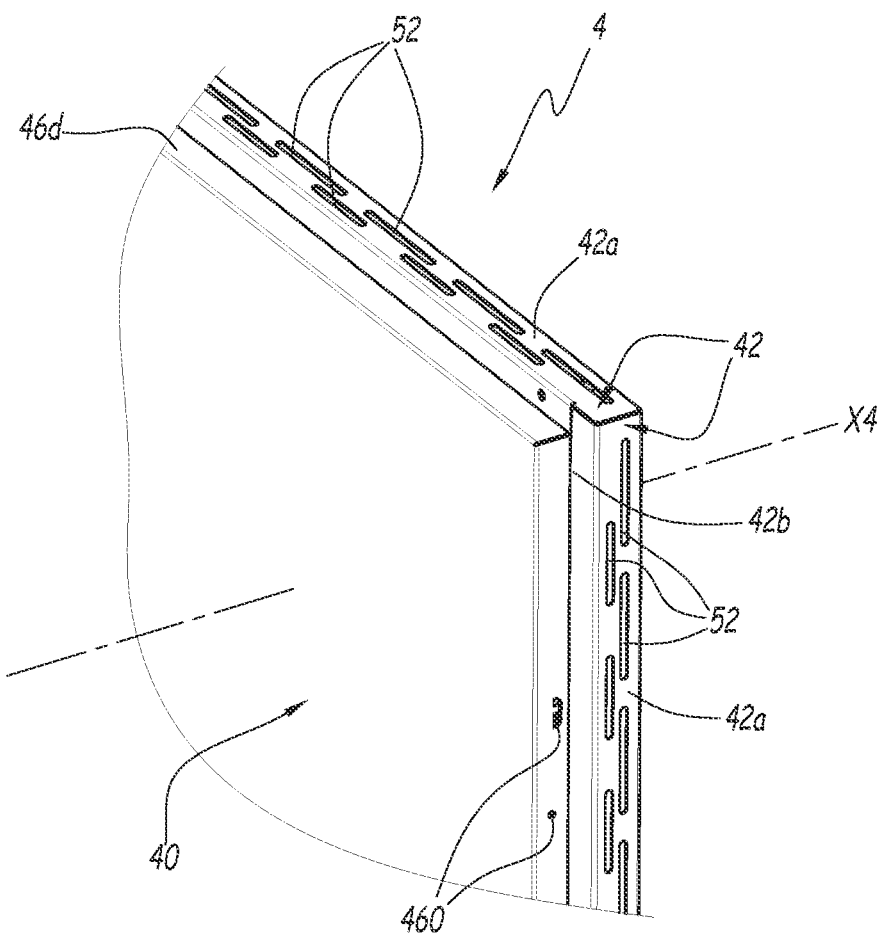
FIG. 2 is a perspective view, from an inner side, of an upper portion of the insulating panel of FIG. 2.
Figure 3:
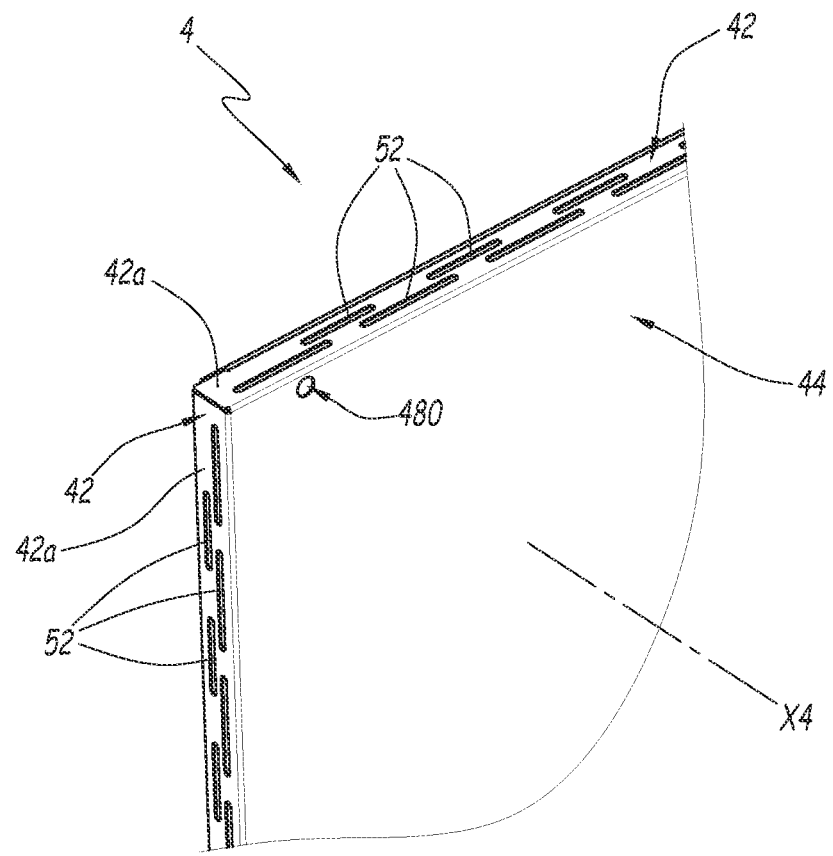
FIG. 3 is a perspective view, from an outer side, of the insulating panel of FIG. 2.

In order to prevent thermal bridges between the inner sheet 46 and the outer sheet 48, the edge 42 comprises two rows 52a and 52b of perforations 52. The perforations 52 are in fact holes that provide a communication between the inside space of the insulating panels, filled with insulating material 50, and the outside environment E. A first row 52a is located on the side of the portion 42b, while the second row 52b is located on the side of the outer wall 44. The perforations 52 of the second row 52b are placed in a staggered manner with respect to the perforations of the first row 52a, as represented on FIGS. 2, 3 and 4. In other words, the perforations 52 of the second row of perforations 52b cover spaces 54 separating the perforations 52 of the first row of perforations 52a. Along the direction X42, the perforations of the second row 52b have a length superior to the length of the spaces 54.

The perforations 52 are provided on the folded portion 42a of the outer sheet 48.

Figure 4:
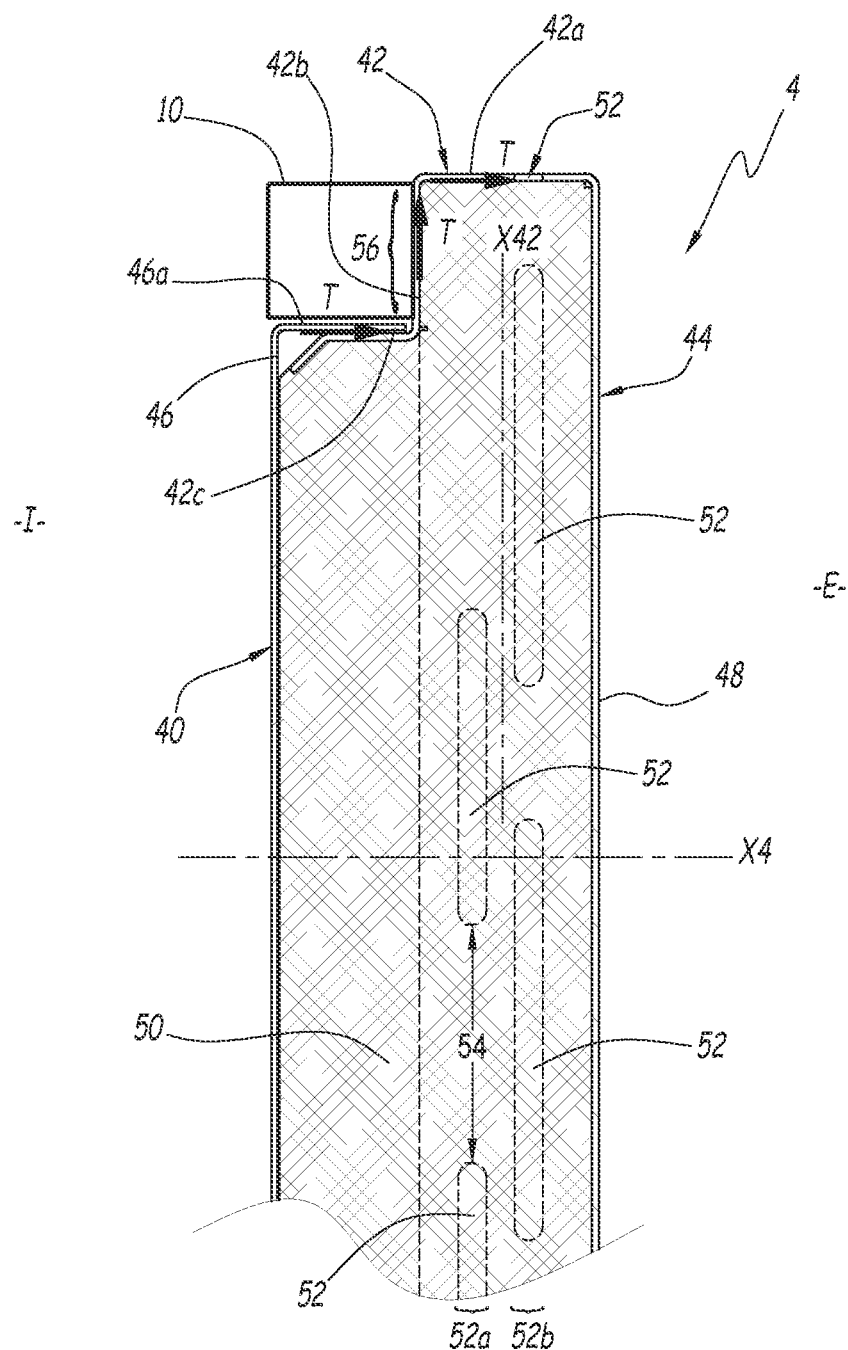
FIG. 4 is a sectional view of the insulating panel of FIGS. 2 and 3.

As shown on FIG. 4, along a path going from the inner wall 40 towards the outer wall 44, the rows of perforations 52 are located after the fastening area 56 of the insulating panel 4 with the structural beam 10. In other words, with analogy with a fluid stream, the perforations are located "downstream" the fastening area 56. This means that any thermal conduction from the insulating panel 4 towards the structural beam 10 can only happen before the thermal bridge is interrupted. The fastening between the insulating panel 4 and the structural beam 10 cannot therefore lead to thermal bridge conduction through the structural beam 10.

The perforations 52 may have an elongated shape extending along longitudinal axes X42 of the edges 42, perpendicular to the direction X4 and defined by the edges 42. The perforations may have rounded ends. According to non-shown variants, the perforations may have a square shape, or any other shape.

Thanks to the construction of the perforations 52, thermal conduction, formed by a thermal conduction path represented on FIG. 4 by the arrow T, initiating from the inner wall 40 towards the outer wall 44, is reduced. The path for thermal conduction is compelled to cross at least one perforation 52 and is therefore interrupted by the perforations 52. The second row 52b of perforations 52 allows interrupting thermal paths passing between the perforations 52 of the first row 52a. The two rows of perforations 52 create a thermal baffle by reducing the width available for thermal conduction and lengthening the thermal conduction path and forming direction changes.

Depending on the thickness of the insulating panels 4, more than two rows of perforations 52 can be provided, if the mechanical strength of the insulating panels 4 is guaranteed. The inner sheet 46 may comprise mounting or fastening holes 460, provided on the portions 46a, for passing non-shown fasteners for assembling the panels 4 to the structural beams 10. The outer sheet 48 may comprise holes 480, provided on the outer wall 44, for passing fasteners.

The structure of the insulating panel 4 with a double row of perforations 52 can also be applied to the door 6 of the air handling unit 2.

The perforations 52 may be preferably realized by punching, laser cutting, or any convenient means during the manufacturing of the outer sheet 48.

The insulating material 50 may be glass wool, rock wool or any other convenient material.

The metal sheets forming the inner sheet 46 and the outer sheet 48 may be standard steel or any other convenient material.

Figure 5:
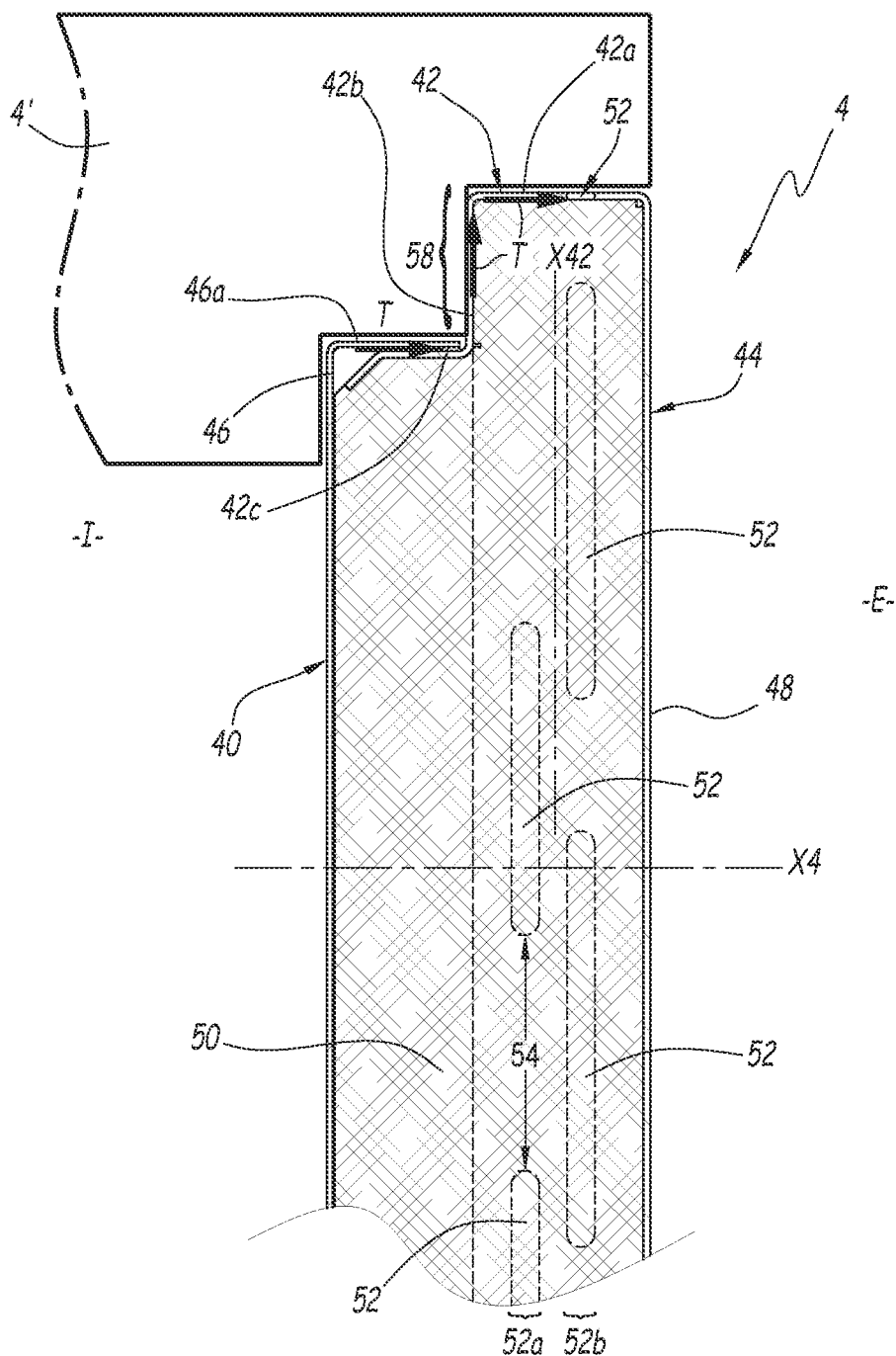
FIG. 5 is a sectional view similar to FIG. 4, in which the insulating panel is fastened to another insulating panel.

According to another embodiment of the invention represented on FIG. 5, the insulated airflow casing 2 may be built without a frame or structural beams 10. In this case, the insulating panels may be fastened together. Thus on FIG. 5 is represented another insulating panel 4', that is fastened to the insulating panel 4. The insulating panel 4' is fastened to the insulating panel by contact with the portion 42b, forming a fastening area 58. The rows of perforations 52 are located after the fastening area 58 of the insulating panel 4 with the insulating panel 4', preventing any thermal bridge through the insulating panel 4'.

According to a non-shown variant, the perforations 52 may be provided on superimposed folded portions of the inner and outer sheets 46 and 48 located after the fastening areas 56 and 58, with respect to the path going from the inner wall 40 towards the outer wall 44.

According to a non-shown variant, the perforations 52 may be provided on the portion 42b of the outer sheet 48 instead of the portion 42a. In such as case, the contact point of the portion 42b with the structural beam 10 or the other insulating panel 4' should be located before the perforations 52, with respect to the path going from the inner wall 40 towards the outer wall 44.

The features of the embodiments and variants described here above may be combined to form new embodiments within the scope of the claims.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. Insulating panel for an insulated air-flow casing, comprising:
   an inner sheet forming an inner wall;
   an outer sheet fastened to the inner sheet and forming an outer wall;
   a layer of insulating material placed between the inner and outer sheets; and
   at least two peripheral edges extending transversally between the inner wall and the outer wall, the at least two peripheral edges including a first peripheral edge having a first longitudinal axis and a second peripheral edge having a second longitudinal axis, the first longitudinal axis perpendicular to the second longitudinal axis;
   wherein the at least two peripheral edges each comprises at least a first row and a second row of perforations, and
   wherein the perforations of the second row are placed with respect to the first row of perforations in a staggered manner.

2. The insulating panel according to claim 1, wherein along a direction transversal to the at least two peripheral edges, the perforations of the second row of perforations cover spaces separating the perforations of the first row of perforations, such that a thermal dissipation path going from the inner wall toward the outer wall crosses at least one of the perforations.

3. The insulating panel according to claim 1, wherein along a path going from the inner wall toward the outer wall, the rows of perforations are located after a fastening area of the insulating panel, the fastening area configured to fasten the insulating panel to a structure of the insulated air-flow casing.

4. The insulating panel according to claim 1, wherein along a path going from the inner wall toward the outer wall, the rows of perforations are located after a fastening area of the insulating panel, the fastening area configured to fasten the insulating panel to a second insulating panel of the insulated air-flow casing.

5. The insulating panel according to claim 1, wherein the at least two peripheral edges are formed by a folded portion of the outer sheet.

6. The insulating panel according to claim 1, wherein the perforations have an elongated shape extending along the longitudinal axis defined by the peripheral edge.

7. An insulated airflow casing comprising:
   one or more insulating panels,
   wherein at least one insulating panel comprises:
   an inner sheet forming an inner wall;
   an outer sheet fastened to the inner sheet and forming an outer wall;
   a layer of insulating material placed between the inner and outer sheets; and
   at least two peripheral edges extending transversally between the inner wall and the outer wall, the at least two peripheral edges including a first peripheral edge having a first longitudinal axis and a second peripheral edge having a second longitudinal axis, the first longitudinal axis perpendicular to the second longitudinal axis;
   wherein the peripheral edge comprises at least a first row and a second row of perforations, and
   wherein the perforations of the second row are placed with respect to the first row of perforations in a staggered manner.

8. The insulated airflow casing according to claim 7, wherein along a direction transversal to the peripheral edge, the perforations of the second row of perforations cover spaces separating the perforations of the first row of perforations, such that a thermal dissipation path going from the inner wall toward the outer wall crosses at least one of the perforations.

9. The insulated airflow casing according to claim 7, wherein along a path going from the inner wall toward the outer wall, the rows of perforations are located after a fastening area of the insulating panel, the fastening area configured to fasten the insulating panel to a structure of the insulated air-flow casing.

10. The insulated airflow casing according to claim 7, wherein along a path going from the inner wall toward the outer wall, the rows of perforations are located after a fastening area of the insulating panel, the fastening area configured to fasten the insulating panel to a second insulating panel of the insulated air-flow casing.

11. The insulated airflow casing according to claim 7, wherein the peripheral edge is formed by a folded portion of the outer sheet.

12. The insulated airflow casing according to claim 7, wherein the perforations have an elongated shape extending along the longitudinal axis defined by the peripheral edge.

* * * * *